(12) United States Patent
Bowling et al.

(10) Patent No.: US 9,803,390 B1
(45) Date of Patent: Oct. 31, 2017

(54) APPARATUS AND METHOD FOR ASSISTING A USER IN ACTUATING A LOCKING MECHANISM ASSOCIATED WITH A STORAGE DEVICE

(71) Applicants: Anna Marie Bowling, Williamston, MI (US); Kelley Alexandra Catton, Webberville, MI (US); Robert David Cheney, Williamston, MI (US); Emma Rosalie Drake, Williamston, MI (US); Jessica Pietrina Glynn, Williamston, MI (US); John Gerald Hull, Williamston, MI (US); Justin Taylor Kreis, Williamston, MI (US); Sarah Margaret McGoff, Williamston, MI (US); Joseph Andrew Rasmus, Saranac, MI (US); Ethan Robert Schrader, Williamston, MI (US); Garrett C. B. Smith, Williamston, MI (US); Kepler Dillan Tiedje, Williamston, MI (US)

(72) Inventors: Anna Marie Bowling, Williamston, MI (US); Kelley Alexandra Catton, Webberville, MI (US); Robert David Cheney, Williamston, MI (US); Emma Rosalie Drake, Williamston, MI (US); Jessica Pietrina Glynn, Williamston, MI (US); John Gerald Hull, Williamston, MI (US); Justin Taylor Kreis, Williamston, MI (US); Sarah Margaret McGoff, Williamston, MI (US); Joseph Andrew Rasmus, Saranac, MI (US); Ethan Robert Schrader, Williamston, MI (US); Garrett C. B. Smith, Williamston, MI (US); Kepler Dillan Tiedje, Williamston, MI (US)

(*) Notice: Subject to any disclaimer, the term of this patent is extended or adjusted under 35 U.S.C. 154(b) by 0 days.

(21) Appl. No.: 15/206,893

(22) Filed: Jul. 11, 2016

(51) Int. Cl.
*E05B 17/22* (2006.01)
*E05B 37/00* (2006.01)
(Continued)

(52) U.S. Cl.
CPC .......... *E05B 17/22* (2013.01); *E05B 37/0048* (2013.01); *E05B 47/0012* (2013.01);
(Continued)

(58) Field of Classification Search
CPC .. E05B 17/22; E05B 37/0048; E05B 47/0012; E05B 65/025; E05B 2047/0069;
(Continued)

(56) References Cited

U.S. PATENT DOCUMENTS 2,023,742 A 12/1935 North
3,447,348 A * 6/1969 Dauenbaugh ........... E05B 37/00
70/285

(Continued)

OTHER PUBLICATIONS

Spinello, Serena, eHow Contributor, "Why Middle School Lockers Should Have Locks", Blog [online], Retrieved from the Internet: <URL: www.zephyrlock.com/news/6/Why-Middle-School-Lockers-Should-Have-Locks.html>, Originally Published on May 6, 2011, saved on May 16, 2016 per Wayback Machine [Retrieved from Wayback Machine Database on Jul. 27, 2016]; 2 pages.

(Continued)

*Primary Examiner* — Rita Leykin
(74) *Attorney, Agent, or Firm* — Howard & Howard Attorneys PLLC

(57) ABSTRACT

An apparatus and method for assisting a user in actuating a locking mechanism associated with a storage device. The locking mechanism has a combination input device and a lock capable of being switched from a locked state to an (Continued)

unlocked state upon entering a preset combination using the combination input device. The actuator comprises an interface configured to releasably engage the combination input device of the locking mechanism and move the combination input device to actuate the locking mechanism and transition the lock from the locked state to the unlocked state. A controller is in communication with the actuator and configured to operate the actuator so that the actuator moves the combination input device based on the preset combination to actuate the locking mechanism and transition the lock from the locked state to the unlocked state.

18 Claims, 8 Drawing Sheets

(51) Int. Cl.
E05B 65/02 (2006.01)
E05B 47/00 (2006.01)
G06K 9/46 (2006.01)
H04N 5/232 (2006.01)

(52) U.S. Cl.
CPC .......... E05B 65/025 (2013.01); G06K 9/4671 (2013.01); H04N 5/232 (2013.01)

(58) Field of Classification Search
CPC ........ E05B 15/00; E05B 17/10; E05B 17/226; E05B 2047/0021; E05B 2047/0031; E05B 37/00; E05B 47/0676; E05B 47/0688; E05B 49/00; E05B 65/0075; E05B 65/0082; E05B 1/0092; E05B 2047/0023; G06K 9/4671; H04N 5/232
USPC ....................................................... 318/685
See application file for complete search history.

(56) References Cited

U.S. PATENT DOCUMENTS

| | | | | |
|---|---|---|---|---|
| 3,572,069 A * | 3/1971 | Junkunc | ............... | E05B 37/0034 70/285 |
| 3,573,621 A * | 4/1971 | Ulstad | ..................... | H04L 27/00 375/242 |
| 3,742,742 A * | 7/1973 | Foote | ..................... | E05B 37/00 292/DIG. 68 |
| 4,745,784 A * | 5/1988 | Gartner | ............... | E05B 47/0688 70/133 |
| 4,831,851 A * | 5/1989 | Larson | ............... | E05B 47/0002 70/277 |
| 4,905,490 A * | 3/1990 | Wilson | .................. | E05B 19/205 70/313 |
| 5,020,345 A * | 6/1991 | Gartner | ............... | E05B 47/0012 70/277 |
| 5,033,282 A * | 7/1991 | Gartner | ............... | E05B 47/0012 70/119 |
| 5,184,491 A * | 2/1993 | Schittenhelm | .......... | E05B 37/08 70/278.1 |
| 5,715,716 A * | 2/1998 | Miller | ................. | E05B 17/2084 292/144 |
| 5,845,523 A * | 12/1998 | Butterweck | ............. | E05B 41/00 292/144 |
| 5,887,467 A * | 3/1999 | Butterweck | ............. | E05B 41/00 292/144 |
| 5,933,086 A * | 8/1999 | Tischendorf | ........ | E05B 47/0012 340/12.22 |
| 6,116,066 A * | 9/2000 | Gartner | .................. | E05B 41/00 292/348 |
| 6,185,773 B1 * | 2/2001 | Goedde | ............... | E05B 47/0012 340/10.1 |
| 6,879,243 B1 * | 4/2005 | Booth | .................. | E05B 47/026 340/5.73 |
| 6,911,897 B2 * | 6/2005 | Miller | ..................... | E05B 37/00 340/5.55 |
| 7,040,675 B1 * | 5/2006 | Ott | ............................. | B60J 7/19 292/123 |
| 7,132,925 B2 * | 11/2006 | Johnson | ............... | A47G 29/141 340/12.52 |
| 7,909,419 B2 * | 3/2011 | Vinke | ................... | E05B 1/0038 109/68 |
| 8,635,893 B2 * | 1/2014 | Miller | ..................... | E05B 49/00 70/283 |
| 8,876,172 B2 * | 11/2014 | Denison | ............. | E05B 47/0012 292/144 |
| 9,080,349 B2 * | 7/2015 | Burrus | ..................... | E05B 37/00 |
| 9,120,446 B2 * | 9/2015 | Thomas | .................. | B60R 25/00 |
| 9,399,566 B2 * | 7/2016 | Hall | ......................... | B66D 1/38 |
| 9,422,746 B1 * | 8/2016 | Zhang | .................. | E05B 47/026 |
| 9,695,615 B2 * | 7/2017 | Houlihan | ............ | E05B 37/0034 |
| 2001/0025340 A1 * | 9/2001 | Marchant | ............ | G06F 12/1408 713/150 |
| 2005/0217326 A1 * | 10/2005 | Shao | ....................... | E05B 37/08 70/303 A |
| 2008/0196460 A1 * | 8/2008 | Houlihan | ............... | E05B 9/084 70/285 |
| 2009/0280862 A1 * | 11/2009 | Loughlin | ............... | E05B 29/00 455/556.1 |
| 2010/0300163 A1 * | 12/2010 | Loughlin | ............... | E05B 37/08 70/301 |
| 2016/0003270 A1 * | 1/2016 | Franklin | ................... | F16B 1/00 439/529 |
| 2016/0208520 A1 * | 7/2016 | Jordan | ................... | E05B 65/46 |

OTHER PUBLICATIONS

American Chiropractic Association, "Backpack Misuse Leads to Chronic Back Pain, Doctors of Chiropractic Say", Serial [online], Retrieved from the Internet: <URL: http://www.acatoday.org/content_css.cfm?CID=65>, First Saved on Jun. 21, 2010 per Wayback Machine, retrieved saved version dated Sep. 12, 2015 [Retrieved from Wayback Machine Database on Jul. 27, 2016]; 2 pages.

DEBATE.org, Should schools have lockers?, Serial [online], Retrieved from the Internet: <URL http://www.debate.org/opinions/should-schools-have-lockers>, First Saved on Oct. 3, 2013 per Wayback Machine [Retrieved from Debate.org on Jul. 27, 2016]; 2 pages.

Falco, Miriam, CNN.com, "Autism rates now 1 in 68 U.S. children: CDC—CNN.com", Serial [online], Retrieved from the Internet: <URL: http://www.cnn.com/2014/03/27/health/cdc-autism/>, Published on Mar. 28, 2014 per CNN.com [Retrieved from CNN.com on Jul. 27, 2016]; 4 pages.

Patino, Erica, understand.org, USA LLC, "Understanding Dyspraxia", Serial [online], Retrieved from the Internet: <URL: https://www.understood.org/en/learning-attention-issues/child-learning-disabilites/dyspraxia/understanding-dyspraxia>, First Saved on Oct. 8, 2014 per Wayback Machine, retrieved saved version dated May 29, 2016 [Retrieved from Wayback Machine on Jul. 27, 2016]; 7 pages.

Coldewey, Devin, Today MONEY.com, Students build robotic locker opener for disabled classmate, Serial [online], Retrieved from the Internet: <URL: http://www.today.com/money/students-build-robotic-locker-opener-disabled-classmate-1C9847234>, Published on May 8, 2013 at 7:59 p.m. per Today Money.com, First Saved on Mar. 5, 2016 per Wayback Machine, [Retrieved from Today Money.com on Jul. 27, 2016]; 5 pages.

Halterman, T. E., 3D Design, 3D Printing, "NJ Students Design 3D Printed Handle to Enable a Disabled Classmate to Open Her Locker ", Serial [online], Retrieved from the Internet: <URL: http://3dprint.com/33514/school-locker-3d-printing-hack/>, Published on Dec. 26, 2014 per 3D Design, 3D Printing, First Saved on Dec. 28, 2014 per Wayback Machine, [Retrieved from 3D Design, 3D Printing on Jul. 27, 2016]; 2 pages.

Master Lock Company LLC, Product User Videos [online], Retrieved from the Internet: <URL: http://www.masterlock.com/cms/training-and-informational-videos/user-student-videos>, First

(56) References Cited

OTHER PUBLICATIONS

Saved on Jan. 13, 2015 per Wayback Machine, [Retrieved from Master Lock on Jul. 27, 2016]; 2 pages.

CES Company, "Model T-70", Product line and Manual [online], Retrieved from the Internet: <URL: http://www.cescompany.com/html/school_locks.html#T70>, First Saved on Aug. 31, 2013 per Wayback Machine, [Retrieved from CES Company on Jul. 27, 2016]; 6 pages.

Kumparak, Greg, The Daily Crunch, Serial [online], Retrieved from the Internet: <URL: http://www.techcrunch.com/2015/05/14/this-robot-cracks-open-combination-locks-in-seconds/#.z56vlq:VixT>, Published on May 14, 2015, First Saved on May 15, 2015 per Wayback Machine, [Retrieved from Tech Crunch on Jul. 27, 2016]; 2 pages.

\* cited by examiner

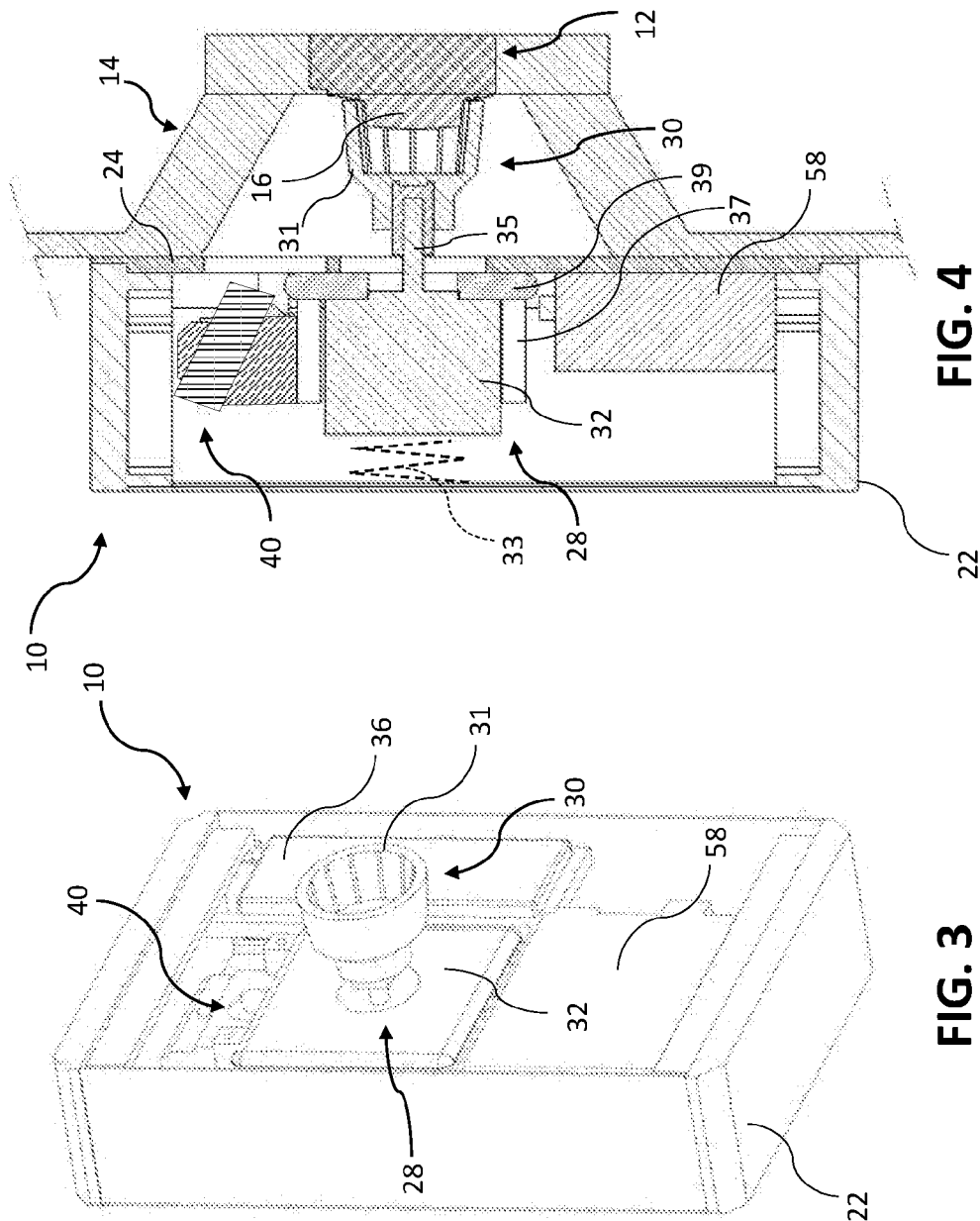

APPARATUS AND METHOD FOR ASSISTING A USER IN ACTUATING A LOCKING MECHANISM ASSOCIATED WITH A STORAGE DEVICE

TECHNICAL FIELD

The present disclosure relates to an apparatus and method for assisting a user in actuating a locking mechanism associated with a storage device.

BACKGROUND

Storage devices, such as storage lockers, are well known for storing items. Storage devices define a storage space into which the items can be placed by a user for safekeeping. In order to ensure that others do not have access to the user's items in the storage device, a locking mechanism is associated with the storage device. One example of such a locking mechanism is a combination locking mechanism. A typical combination locking mechanism includes a combination input device, such as a single numbered dial, and a lock. The combination locking mechanism can be integrated into the storage device. For instance, the combination locking mechanism can be integrated into a door of the storage device such that the dial protrudes from a surface of the door for being grasped and rotated by the user.

The dial is usually graduated with equally spaced dial markings about its periphery to represent combination numerals, e.g., from 0 to 39, 0 to 49, 0 to 59, and the like, with at least a single dial marking associated with each whole numeral in the range. During manufacture, or with use of a master key, the lock is set to unlock only upon entering a preset combination of the numerals using the dial. More specifically, in order to unlock the lock, the user must carry out a specific combination of clockwise and counterclockwise rotations to align the dial markings associated with the numerals of the preset combination with a fixed target. This may include first rotating the dial at least two full rotations clockwise to reset the lock, rotating the dial clockwise to align a first dial marking associated with a first numeral with the fixed target, next rotating the dial counterclockwise to align a second dial marking associated with a second numeral with the fixed target, and finally rotating the dial clockwise to align a third dial marking associated with a third numeral with the fixed target.

Often, the dial markings are spaced very closely together making aligning them with the fixed target difficult. Additionally, the dial itself is often very small, making grasping and rotation of the dial to actuate the combination locking mechanism difficult. Usually, good dexterity and/or fine motor skills are required to be able to perform the rotations needed to place the lock in an unlocked state. Unfortunately, this can make use of such locking mechanisms by people that don't have the requisite dexterity and/or fine motor skills very frustrating, such as persons with disabilities. Additionally, people with autism or neurodevelopmental disabilities may find recalling the preset combination difficult.

Therefore, there is a need in the art for addressing one or more of the aforementioned deficiencies.

SUMMARY

In one embodiment an apparatus for assisting a user in actuating a locking mechanism is provided. The locking mechanism has a combination input device and a lock capable of being switched from a locked state to an unlocked state upon entering a preset combination using the combination input device. The locking mechanism is associated with a storage device. The apparatus comprises a housing. An actuator is coupled to the housing. The actuator comprises an interface configured to releasably engage the combination input device of the locking mechanism and move the combination input device to actuate the locking mechanism and transition the lock from the locked state to the unlocked state. A controller is in communication with the actuator. The controller is configured to operate the actuator so that the actuator moves the combination input device based on the preset combination to actuate the locking mechanism and transition the lock from the locked state to the unlocked state.

A method for using an apparatus to actuate a locking mechanism is also provided. The apparatus comprises an actuator, an interface coupled to the actuator, and a controller in communication with the actuator. The locking mechanism has a combination input device and a lock capable of being switched from a locked state to an unlocked state upon entering a preset combination using the combination input device. The locking mechanism is associated with a storage device. The method comprises placing the apparatus relative to the storage device such that the interface releasably engages the combination input device. The method further comprises initiating operation of the actuator to move the combination input device based on the preset combination to actuate the locking mechanism and transition the lock from the locked state to the unlocked state.

One advantage of these embodiments is the ability to enter the preset combination using the actuator and controller. As a result, in some cases, once operation of the actuator is initiated, the combination input device is moved as needed until the lock is in the unlocked state. The eliminates the need for the user to make the necessary combination of movements of the combination input device in order to open their storage device and access the items stored therein. Accordingly, persons with disabilities can more easily use such locking mechanisms to keep their items secure.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a perspective view of the apparatus with a front plate removed.

FIG. 4 is a cross-sectional view of the apparatus mounted on the storage device.

DETAILED DESCRIPTION

Figure 1:
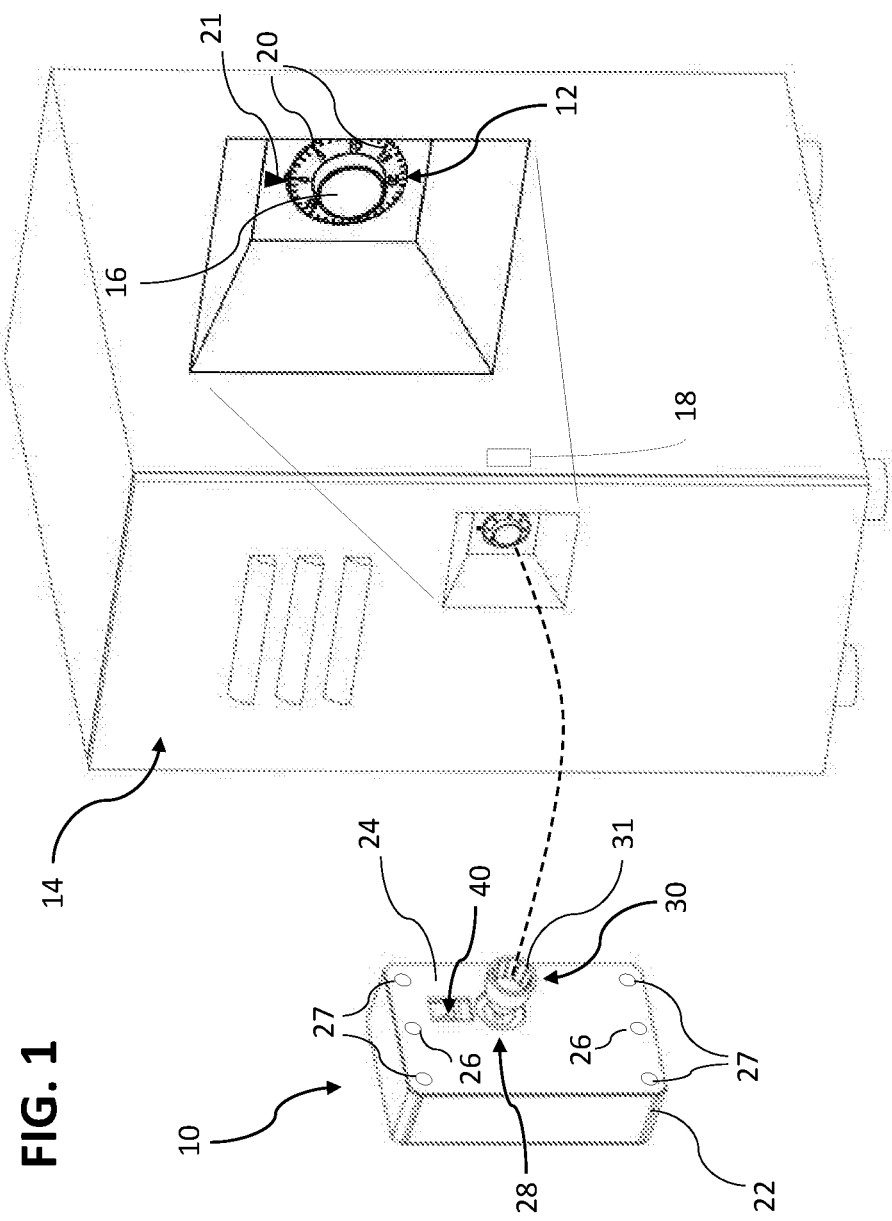
FIG. 1 is a perspective view of an apparatus for assisting a user in actuating a locking mechanism on a storage device.
Figure 2:
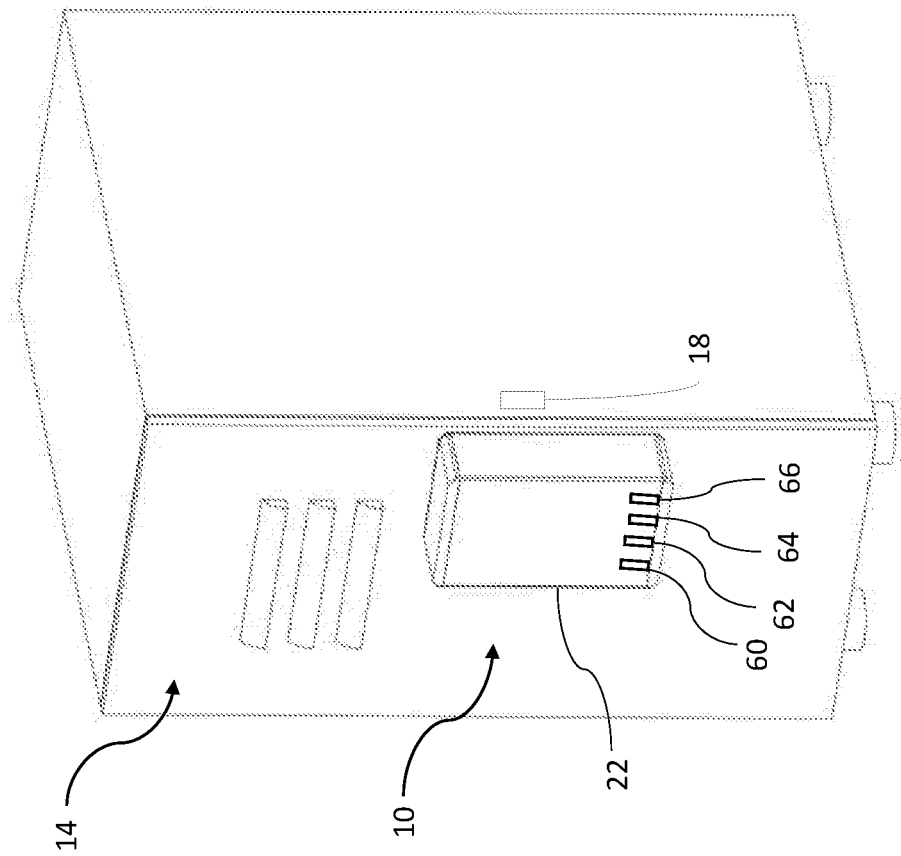
FIG. 2 is a perspective view of the apparatus shown temporarily mounted on the storage device.

Referring to FIGS. 1 through 5, an apparatus 10 is shown generally for assisting a user in actuating a locking mechanism 12. In the embodiment shown, the locking mechanism 12 is associated with a storage device 14. The apparatus 10 is shown temporarily mounted to a front door of the storage device 14, into which the locking mechanism 12 is integrated. The apparatus 10 is temporarily mounted to the storage device 14 to actuate, e.g., unlock, the locking mechanism 12 so that the user is able to gain access to a storage space defined inside the storage device 14. Here, the storage device 14 is a storage locker assigned to the user, such as a school locker or gym locker, and the locking mechanism 12 is a combination locking mechanism. In other embodiments, the storage device 14 may be a cabinet, desk, or any other device for storing items. Furthermore, the locking mechanism 12 may be associated with other types of devices, aside from storage devices, which may need to be secured for one reason or another.

The locking mechanism 12 comprises a combination input device 16 and a lock 18. The combination input device 16 shown is a single numbered dial with a knob that protrudes from a recessed outer surface of the front door of the storage device 14. The knob is configured to be grasped and rotated by the user. In other embodiments, the combination input device 16 may comprise a series of dials arranged adjacent one another. The combination input device 16 is graduated with equally spaced dial markings 20 about its periphery to represent combination numerals, e.g., from 0 to 39, from 0 to 49, from 0 to 59, and the like, with at least a single dial marking associated with each whole numeral in the range. In other embodiments, the combination input device may be used to input a sequence of numerals, characters, symbols, and/or combinations thereof.

The lock 18 is capable of being set to a locked state and switched from the locked state to an unlocked state upon entering a preset combination (e.g., of numeric, alphanumeric and/or other characters or symbols) using the combination input device 16. The lock 18 may comprise a latch, such as a locking bolt, or other types of locks. The locking mechanism 12, and the lock thereof, may come in various forms and styles. Examples of the locking mechanism 12, and the manner in which the lock 18 is set to the locked state and switched to the unlocked state upon entering the preset combination, are shown in U.S. Pat. No. 2,023,742 to North and U.S. Pat. No. 3,447,348 to Dauenbaugh, both of which are hereby incorporated by reference in their entirety.

During manufacture, with use of a master key, or by other methods, the locking mechanism 12 is set so that the lock 18 only moves to the unlocked state upon entering the preset combination using the combination input device 16. Once the locking mechanism 12 is set with the preset combination, the lock 18 can be moved from the locked state to the unlocked state by a specific combination of clockwise and counterclockwise rotations of the combination input device 16 (e.g., the dial), as discussed in U.S. Pat. No. 2,023,742 to North and U.S. Pat. No. 3,447,348 to Dauenbaugh, both of which are hereby incorporated by reference in their entirety.

Normally, the user carries out this specific combination of clockwise and counterclockwise rotations by aligning a sequence of the dial markings 20 associated with the preset combination with a fixed target 21. This may include first manually rotating the combination input device 16 at least two full rotations clockwise to reset the lock 18, manually rotating the combination input device 16 clockwise to align a first dial marking 20 associated with a first numeral with the fixed target 21, next manually rotating the combination input device 16 counterclockwise to align a second dial marking 20 associated with a second numeral with the fixed target 21, and finally manually rotating the combination input device 16 clockwise to align a third dial marking 20 associated with a third numeral with the fixed target 21.

The apparatus 10, in one embodiment of the present invention, is able to perform these same movements of the combination input device 18 in an automated manner, without requiring manual manipulation of the combination input device 18 by the user. The apparatus 10 comprises a housing 22 and is sized to be portable so that the user is able to carry the apparatus 10 between locations, such as between different storage devices 14 requiring different preset combinations for access. In one embodiment, the housing 22 is made of aluminum, but could be formed of other materials, including plastic and the like. The housing 22 comprises a front plate 24 sized and shaped to face the front door of the storage device 14 when the housing 22 is releasably mounted to the storage device 14.

One or more mounting devices 26 may be fixed to the front plate 24, embedded in the front plate 24, or otherwise arranged with respect to the front plate 24 to at least temporarily aid in mounting the apparatus 10 to the storage device 14. In one embodiment, the mounting devices 26 are magnets configured to aid in mounting the housing 22 to the storage device 14 by being attracted to metallic material in the front door of the storage device 14. In some cases, the mounting devices 26 are configured to provide full, unaided support of the housing 22 and apparatus 10 on the storage device 14. In some cases, the magnets employed are electromagnets that can be activated/deactivated to ease mounting and removing the housing 22 from the storage device 14. Bumpers 27 (e.g., plastic, rubber, or the like) may also be fixed to the front plate 24 to space the apparatus 10 slightly away from the front door of the storage device 14, while still enabling the magnets to hold the apparatus 10 on the front door.

An actuator 28 is coupled to the housing 22. The actuator 28 comprises an interface 30 configured to releasably engage the combination input device 16 of the locking mechanism 12. The interface 30 is configured to engage the combination input device 16 so that movement of the interface 30 results in like movement of the combination input device 16 to actuate the locking mechanism 12 and transition the lock 18 from the locked state to the unlocked state.

In the embodiment shown, the interface 30 comprises a coupler 31 configured to engage the combination input device 16. The coupler 31 is configured to grasp and engage the combination input device 16 so that rotation of the coupler 31 results in like rotation of the combination input device 16. In the embodiment shown, the coupler 31 comprises a cup having resilient properties to allow the cup to be press fit onto the knob of the dial. The coupler 31 may be internally ribbed (see spaced ribs in FIG. 4) to facilitate fitting onto the knob of the dial. An internal surface of the coupler 31 may also be slightly flared outwardly to facilitate fitting onto the knob. In the version shown, the coupler 31 extends forward of the front plate 24. In other embodiments, the coupler 31 may partially protrude through the front plate 24 to engage the combination input device 16 or the coupler 31 may be recessed behind the front plate 24 and arranged to engage the combination input device 16 via an opening in the front plate 24.

The coupler 31 may be formed of plastic, metal, combinations thereof, or other materials. In one embodiment, the coupler 31 is formed of plastic and is coated with an elastic coating, such as a rubber coating, to enhance gripping on the knob and securing of the cup on the knob. One type of rubber coating that is suitable is Plasti Dip coating available from Plasti Dip International.

In some versions, a biasing device 33 (see hidden lines in FIG. 4) may be coupled to the coupler 31 to bias the coupler 31 toward the combination input device 16 when the housing 22 is mounted to the storage device 14. The biasing device 33 thus applies a biasing force against the coupler 31 to further secure the coupler 31 on the combination input device 16. The biasing device 33 is schematically represented in FIG. 4 as acting between a back wall of the housing 22 and a back face of the motor 32. The biasing device 33 may have other configurations in other embodiments. For instance, fasteners 37 attach a mounting plate 39 of the actuator 28 to the front plate 24 of the housing 22. These fasteners 37 may be spring-loaded to provide the biasing force on the coupler 31.

Another benefit of the biasing device 33 is that different configurations of storage devices can be accommodated, i.e., the coupler 31 has a range of distances from the front plate 24 at which it can successfully engage the combination input device 16, albeit with different resulting biasing forces of F=kx, where x is the distance the biasing device 33 has been compressed and k is the spring constant of the biasing device 33.

Figure 5:
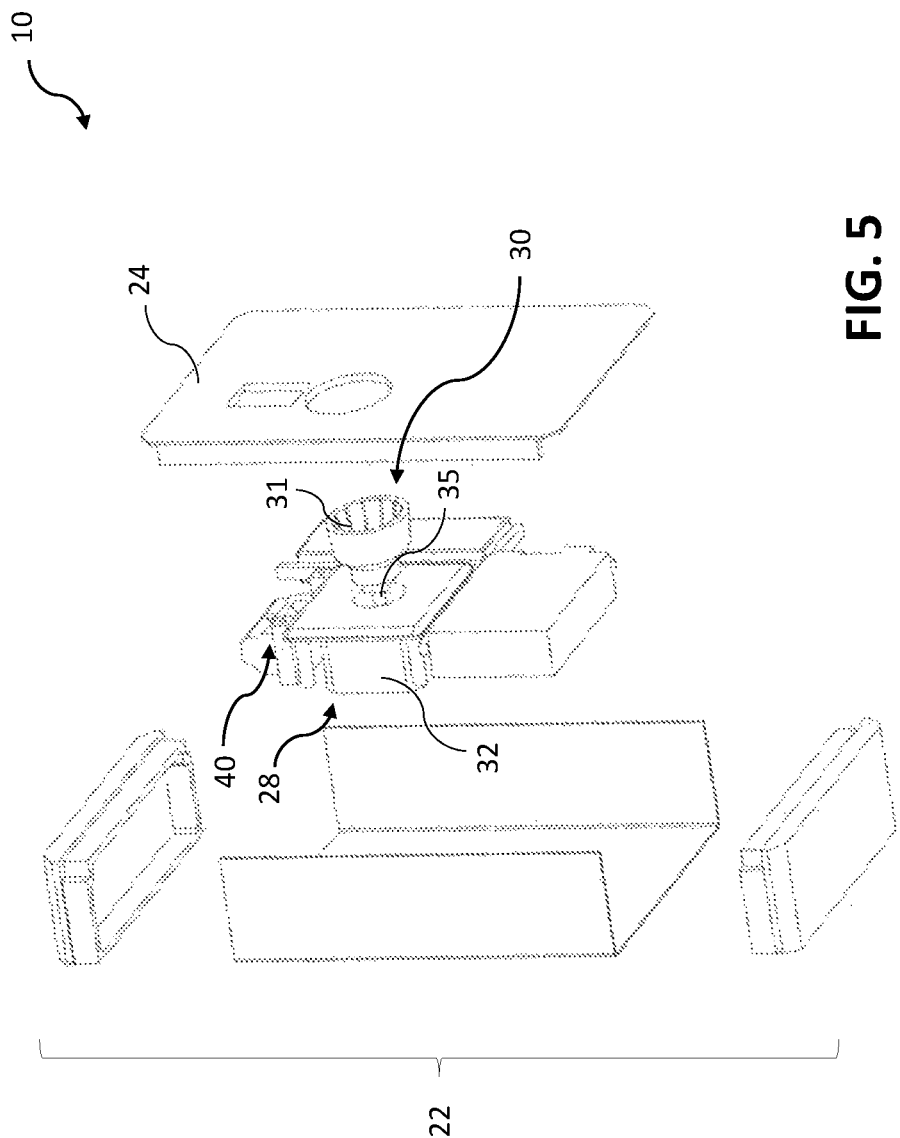
FIG. 5 is a partially exploded view of the apparatus.

With continued reference to FIGS. 3 through 5, the actuator 28 further comprises a motor 32 coupled to the interface 30 to rotate the interface 30 when the interface 30 engages the combination input device 16. In particular, a drive shaft 35 of the motor 32 extends through the front plate 24 to engage the coupler 31 of the interface 30. The coupler 31 has a bore defined in one end for receiving the drive shaft 35. The bore may have a specific geometric cross-section, such as a D-shape, with the drive shaft having a mating D-shape, or other shape, so that rotation of the drive shaft rotates the coupler 31. It should be appreciated that other arrangements for connecting the motor 32 to the interface 30 are also contemplated. The motor 32 is supported by the housing 22. In some cases, the motor 32 may be fixed to the housing 22. In other cases, the motor 32 may be supported by the housing 22, yet able to move in the housing 22. In one embodiment, the motor 32 is a stepper motor. In one particular embodiment, the stepper motor makes one full rotation in two hundred steps. Other types of motors are also contemplated, such as servo motors and the like.

Figure 6:
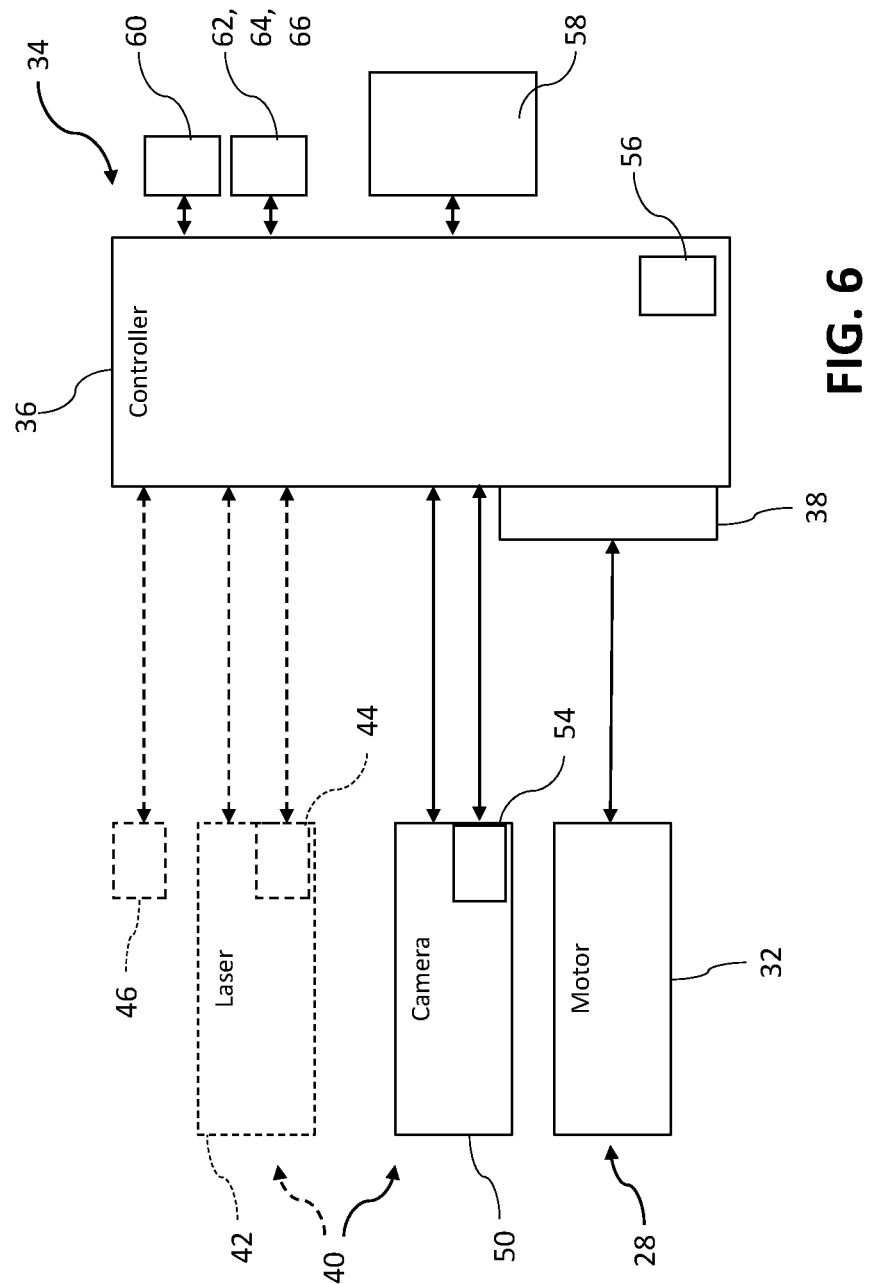
FIG. 6 is a schematic illustration of a control system of the apparatus.

Referring to FIG. 6, a control system 34 of the apparatus 10 is shown. The control system 34 comprises a controller 36 in communication with the actuator 28, specifically the motor 32. The controller 36 is configured to operate the actuator 28 to rotate the combination input device 16 via the interface 30 based on the preset combination using the combination input device 16 to actuate the locking mechanism 12 and transition the lock 18 from the locked state to the unlocked state. The controller 36 is configured to rotate the combination input device 16 in a sequence of clockwise and counterclockwise rotations to enter the preset combination. In one embodiment, the controller 36 is a Raspberry Pi controller available from the Raspberry Pi Foundation, United Kingdom. Additionally or alternatively, the controller 36 may comprise one or more microcontrollers, such as those available from Arduino, field programmable gate arrays, systems on a chip, discrete circuitry, and/or other suitable hardware, software, or firmware that is capable of carrying out the functions described herein. In one embodiment, the controller 36 comprises a printed circuit board (PCB) fixed to the housing 22. In other embodiments, the PCB is mounted to the motor 32 or other components of the apparatus 10.

The control system 34 may further comprise ancillary hardware 38 attached to the motor 32 to increase precision of the motor 32 in rotating the combination input device 16. Such ancillary hardware 38 may comprise a motor HAT (Hardware Attached on Top), which, for example, is an add-on to the controller 36. In one embodiment, such as when fifty whole numerals are located on the combination input device 16, the controller 36 is programmed to rotate the motor 32 by 7.2 degrees for every numeral on the combination input device 16 (e.g., numerals 0-49).

The control system 34 also comprises a datum finder 40 configured to identify a datum of the combination input device 16. The datum finder 40 is configured to identify a zero position (or other datum) of the combination input device. Two embodiments of the datum finder 40 are shown simultaneously in FIG. 6. In some cases, both may be employed for redundancy, but only one is sufficient.

Figure 7:
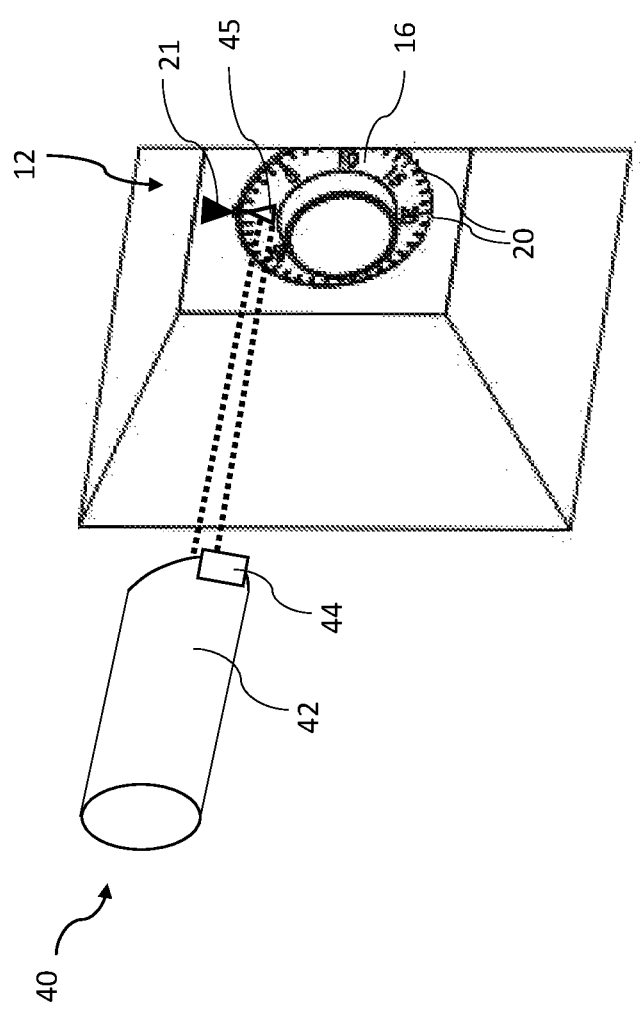
FIG. 7 is an illustration of one embodiment of a datum finder of the control system.

Referring to FIGS. 6 and 7, in one embodiment, the datum finder 40 comprises a light source 42 and a sensor 44 for receiving reflected light from the light source 42 to identify the zero position of the combination input device 16. In one version, a reflective material 45 is placed on the combination input device 16. For instance, the reflective material 45 may be placed adjacent the dial marking 20 associated with the zero on the dial. Additionally, the light source 42 is fixed to the housing 22 and/or to a bracket fixed to the motor 32 so that when the housing 22 is mounted to the storage device 14, the light source 42 has a clear line-of-sight to the fixed target 21 and the dial markings 20 when they pass by the fixed target 21 during rotation. The light source 42 is arranged to direct a laser beam of light (visible, infrared, or other) toward the combination input device 16 so that when the dial marking 20 associated with the zero on the dial reaches the fixed target, e.g., the zero position, the laser beam of light is reflected off the reflective material and back to the sensor 44, which is located adjacent to the light source 42. The sensor 44 may be a photoresistor (e.g., light sensor) that generates a signal corresponding to the amount of light received. During rotation of the combination input device 16 via the actuator 28, the controller 36 is programmed to identify when a peak signal is received by the sensor 44, which indicates that the combination input device 16 has reached the zero position. The controller 36 then sets a corresponding position of the motor 32 as the motor's zero position. From there, the controller 36 is able to step through a sequence of clockwise and counterclockwise rotations to enter the user's combination and actuate the locking mechanism 12.

The datum finder 40 may further comprise an accelerometer 46 (see FIG. 6) in communication with the controller 36 in order to identify an error in the identified zero position. In this case, the controller 36 is configured to correct the zero position based on signals from the sensor 44 and the accelerometer 46. In essence, if the apparatus 10 is mounted askew on the storage device 14 with respect to a vertical axis passing through the fixed target 21 and a center rotational axis of the combination input device 16, then the accelerometer will produce a non-zero gravity error indicating how many degrees askew the apparatus 10 has been mounted. The controller 36 subtracts this amount (positive or negative based on direction) from the originally determined zero position of the motor 32 to determine a corrected zero position of the motor 32.

Figure 8:
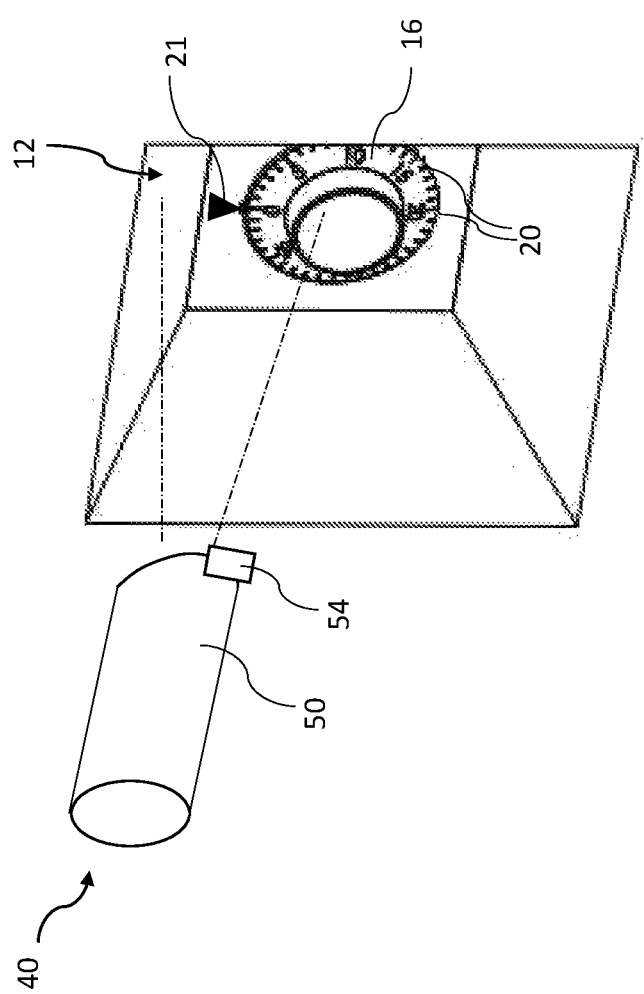
FIG. 8 is an illustration of another embodiment of the datum finder of the control system.

Referring to FIGS. 6 and 8, another embodiment of the datum finder 40 is shown. In this embodiment, the datum finder 40 comprises a camera 50 configured to capture images of the combination input device 16. The camera 50 may be a WaveShare camera compatible with the controller 36. The camera 50 may be fixed to a bracket attached to the motor 32, fixed to the housing 22, or otherwise supported by the housing 22. An LED light 54 may be positioned to direct light toward the combination input device 16 to brighten the area surrounding the combination input device 16 enabling clear images to be captured by the camera 50. The camera 50 is located to capture the fixed target 21 and the numerals on the combination input device 16 adjacent the fixed target 21 in each image.

The controller 36 comprises a pattern recognition module 56 configured to analyze the images captured by the camera 50 to identify the zero position of the combination input device 16. In particular, the pattern recognition module 56 is configured to identify when the dial marking 20 associated with the zero position of the combination input device 16 is aligned with the fixed target 21. Accordingly, when the controller 36 operates the motor 32 to first find the zero position and set the motor's zero position, the camera 50 is continuously capturing images until one of the images has a pattern that matches the pattern associated with the dial marking 20 of the zero being aligned with the fixed target 21. The controller 36 then determines the time that particular image was taken (times can be saved in memory of the control system 34, e.g., non-volatile memory, EEPROM, RAM, etc.) and access the motor's position at that particular time (again, positions of the motor 32 over time can be recorded and saved in the memory). This position becomes the motor's zero position.

A rechargeable battery pack 58 of one or more rechargeable batteries may be disposed in the housing 22 to provide power for the control system 34. The rechargeable battery pack 58 enables the apparatus 10 to be portable, wherein all the components to the control system 34, e.g. the actuator 28, the controller 36, the datum finder 40, and the battery pack 58 are disposed in the housing 22. The battery pack 58 may comprise a 12 volt lithium ion battery or other suitable battery or batteries. In other embodiments, the apparatus 10 is powered by other power sources.

A power switch 60 (see FIGS. 2 and 6) on the housing 22 that is accessible from outside of the apparatus 10 can be used to turn on/off power for all or some components of the control system 34. A separate button 62 may be provided to start operation to actuate the locking mechanism 12 (once the preset combination is programmed into the memory of the controller 36). Additional buttons 64, 66 can be provided to start operation to actuate other locking mechanisms (not shown) associated with other storage devices assigned to the same user, e.g., for separate school and gym lockers, etc. Other types of user interfaces are also possible, including voice activation, touch screens, and the like. A separate user interface can also be provided to program the preset combination into the controller 36. The user interface may comprise a separate portable electronic device, such as an iPhone, iPAD, and the like that can connect through a suitable port (e.g., USB, etc., not shown) to the controller 36. A wireless communication module may also be connected to the controller 36 so that the apparatus 10 can be programmed and/or controlled remotely or wirelessly via a portable electronic device or other electronic device. The user interface may also be used to program the number of numerals on the combination input device 16 (e.g., 30, 40, 50, 60), the number of dials of the combination input device 16, and the like, in order to properly configure operation of the motor 32, i.e., to determine the number of steps associated with movement between numerals.

Figure 9:
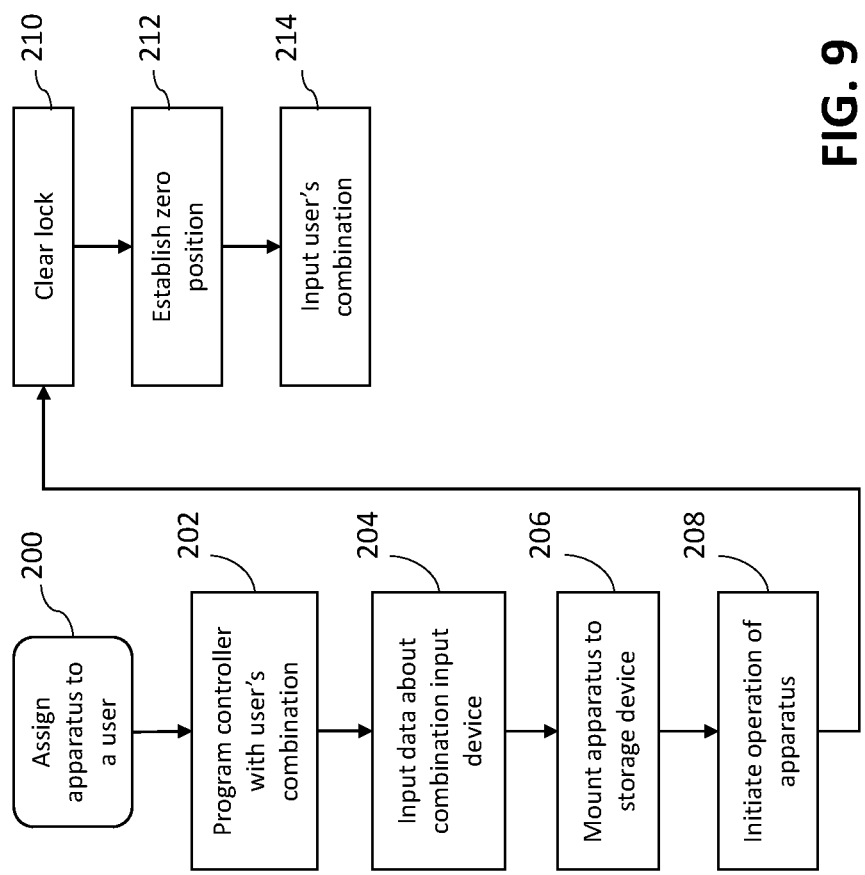
FIG. 9 is a flowchart of steps carried out in one embodiment of the subject invention.

In operation, in one embodiment, the apparatus 10 is first assigned to a user, such as a user with a disability. See step 200 in FIG. 9. The manufacturer, user, or other entity, then programs the controller 36 with the user's preset combination for their storage device 14 in step 202. This may include entering the user's preset combination into the memory of the controller 36 for later access by one or more processors of the controller 36. The range of numerals on the combination input device 16 and/or other data regarding the combination input device 16 is also similarly input into the controller 36 in step 204.

Once programmed, the apparatus 10 is ready to be used. The user first mounts the apparatus 10 to the storage device 14 in step 206 so that the coupler 31 has firmly gripped onto the knob of the combination input device 10. Once mounted, the user initiates operation of the apparatus 10 by actuating the power button 60 and/or the operational button 62 or other suitable user input device at step 208. With power supplied, the apparatus 10 autonomously runs through its cycle to place the lock 18 in the unlocked state without requiring any further interaction or manipulation by the user.

In the embodiment shown, once operation is initiated, the controller 36 is programmed to first operate the actuator 28 and rotate the dial clockwise at least twice to clear the lock 18 from any prior entered numerals in step 210. This may comprise operating the actuator 28 so that the motor 32 completes at least two revolutions in a clockwise direction (or in some cases counterclockwise, depending on the type of lock or arrangement of the motor 32 to the combination input device 16). In other embodiments, the dial may only need to be rotated once to clear the lock, or in other cases, may need to be rotated more than twice. The manner in which the lock 18 is cleared by virtue of clockwise rotations is well known to those having ordinary skill in the art.

Simultaneously, as the dial is rotating, the datum finder 40 is also being employed to find the zero position as described above in order to set the motor's zero position. See step 212. Once the motor's zero position has been established, then the controller 36 is ready to control the actuator 28 to manipulate the combination input device 16 in a sequence of clockwise and counterclockwise rotations in order to input the user's preset combination into the locking mechanism 12 via the combination input device 16 in step 214.

In step 214, in one embodiment, the controller 36 first operates the actuator 28 to rotate the combination input device 16 in the clockwise direction until the dial marking 20 associated with the first numeral of the preset combination has reached the fixed marker 21 and is aligned with the fixed marker 21, e.g., by operating the motor 32 the requisite number of steps in the appropriate direction to reach the first numeral. After the first numeral is reached, the controller 36 then operates the actuator 28 to rotate the combination input device 16 in the counterclockwise direction until the dial marking 20 associated with the second numeral of the preset combination has reached the fixed marker 21 and is aligned with the fixed marker 21 (again, by operating the motor 32 the requisite number of steps in the appropriate direction). Lastly, the controller 36 operates the actuator 28 to again rotate the combination input device 16 in the clockwise direction until the dial marking 20 associated with the third numeral of the preset combination has reached the fixed marker 21 and is aligned with the fixed marker 21. Once the third numeral has been reached, the lock 18 is placed in the unlocked state and the storage device 14 is ready to be opened for access by the user.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. An apparatus for assisting a user in actuating a locking mechanism having a combination input device and a lock capable of being switched from a locked state to an unlocked state upon entering a preset combination using the combination input device, the locking mechanism being associated with a storage device, said apparatus comprising:
    a housing;
    an actuator coupled to said housing, said actuator comprising an interface configured to releasably engage the combination input device of the locking mechanism and move the combination input device to actuate the locking mechanism and transition the lock from the locked state to the unlocked state, wherein said actuator comprises a motor coupled to said interface to rotate said interface when said interface engages the combination input device; and
    a controller in communication with said actuator and configured to operate said actuator so that said actuator moves the combination input device based on the preset combination to actuate the locking mechanism and transition the lock from the locked state to the unlocked state.

2. The apparatus of claim 1, comprising a datum finder configured to identify a datum of the combination input device.

3. The apparatus of claim 2, wherein said datum finder is configured to identify a zero position of the combination input device.

4. The apparatus of claim 3, wherein said datum finder comprises a light source and a sensor for receiving reflected light from said light source to identify the zero position of the combination input device.

5. The apparatus of claim 1, wherein said controller is configured to operate said motor to rotate the combination input device to enter the preset combination using the combination input device, said controller configured to rotate the combination input device in a sequence of clockwise and counterclockwise rotations to enter the preset combination.

6. The apparatus of claim 5, wherein said motor is one of a stepper motor or a servo motor.

7. The apparatus of claim 6, comprising ancillary hardware attached to said stepper motor to increase precision of said stepper motor in rotating the combination input device.

8. The apparatus of claim 5, wherein said interface comprises a coupler configured to engage the combination input device.

9. The apparatus of claim 8, wherein said coupler is formed of plastic and coated with an elastic coating.

10. The apparatus of claim 9, wherein said elastic coating is a rubber coating.

11. The apparatus of claim 1, comprising a mounting device configured to at least aid in mounting said housing to the storage device.

12. The apparatus of claim 11, wherein said mounting device comprises magnets fixed to said housing to releasably mount said housing to the storage device.

13. The apparatus of claim 11, comprising a biasing device wherein said interface comprises a coupler configured to engage the combination input device and said biasing device is coupled to said coupler to bias said coupler toward the combination input device when said housing is mounted to the storage device.

14. The apparatus of claim 1, comprising a rechargeable battery disposed in said housing, wherein said actuator, said controller, and said battery are disposed in said housing so that said apparatus is portable.

15. An apparatus for assisting a user in actuating a locking mechanism having a combination input device and a lock capable of being switched from a locked state to an unlocked state upon entering a preset combination using the combination input device, the locking mechanism being associated with a storage device, said apparatus comprising:
    a housing;
    an actuator coupled to said housing, said actuator comprising an interface configured to releasably engage the combination input device of the locking mechanism and move the combination input device to actuate the locking mechanism and transition the lock from the locked state to the unlocked state;
    a controller in communication with said actuator and configured to operate said actuator so that said actuator moves the combination input device based on the preset combination to actuate the locking mechanism and transition the lock from the locked state to the unlocked state; and
    a datum finder configured to identify a zero position of the combination input device, said datum finder comprising a light source and a sensor for receiving reflected light from said light source to identify the zero position of the combination input device,
    wherein said datum finder comprises an accelerometer configured to identify an error in the identified zero position, said controller configured to correct the zero position based on signals from said sensor and said accelerometer.

16. An apparatus for assisting a user in actuating a locking mechanism having a combination input device and a lock capable of being switched from a locked state to an unlocked state upon entering a preset combination using the combination input device, the locking mechanism being associated with a storage device, said apparatus comprising:
    a housing;
    an actuator coupled to said housing, said actuator comprising an interface configured to releasably engage the combination input device of the locking mechanism and move the combination input device to actuate the locking mechanism and transition the lock from the locked state to the unlocked state;
    a controller in communication with said actuator and configured to operate said actuator so that said actuator moves the combination input device based on the preset combination to actuate the locking mechanism and transition the lock from the locked state to the unlocked state; and
    a datum finder configured to identify a zero position of the combination input device, wherein said datum finder comprises a camera configured to capture images of the combination input device.

17. The apparatus of claim 16, wherein said controller comprises a pattern recognition module configured to analyze the images captured by said camera to identify the zero position of the combination input device.

18. The apparatus of claim 17, wherein said pattern recognition module is configured to identify when a marking associated with the zero position of the combination input device is aligned with a fixed target.

* * * * *